Oct. 13, 1936. F. O. CARLSON 2,057,008
SAFETY DEVICE
Filed March 2, 1936
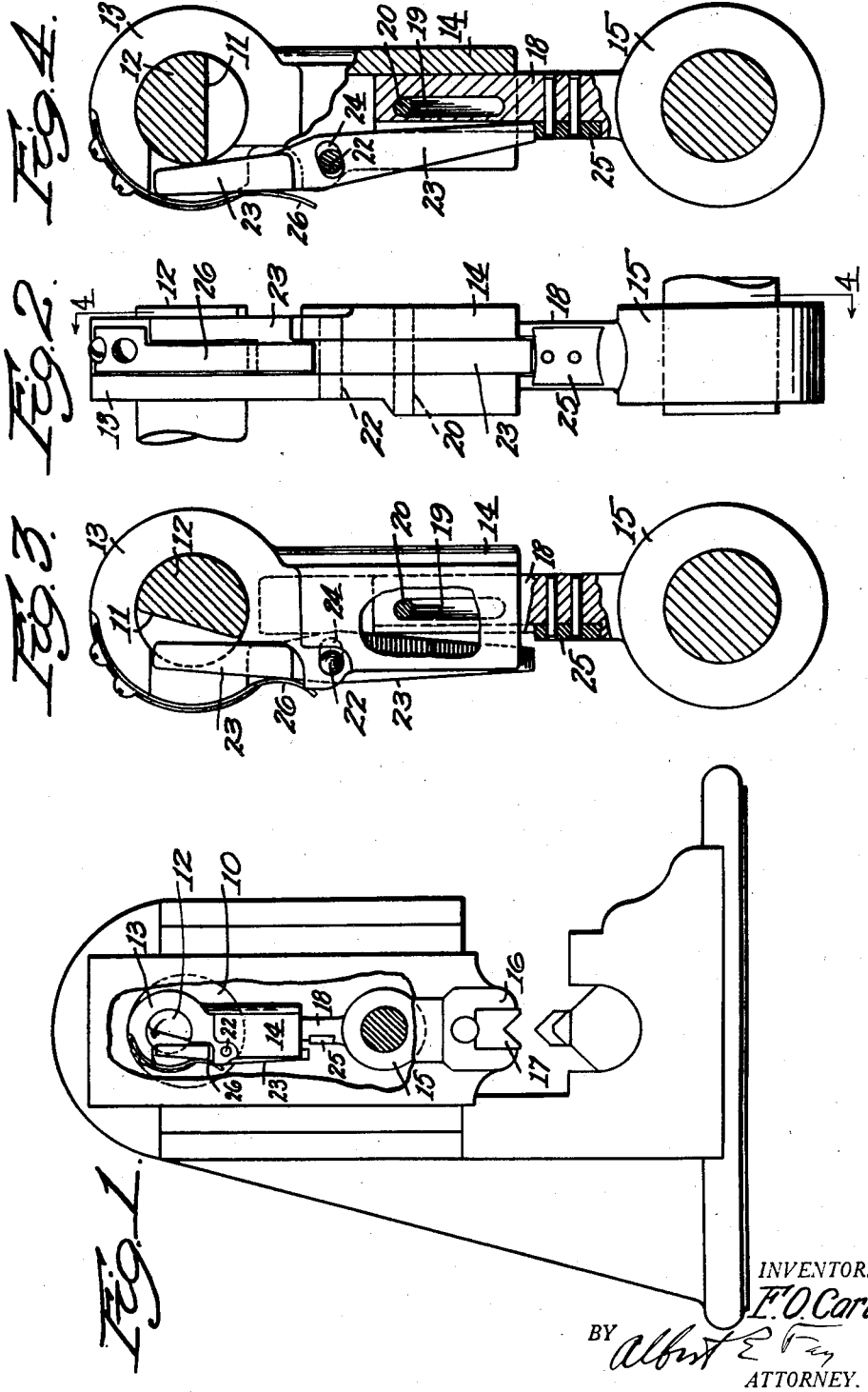
INVENTOR.
F. O. Carlson
BY
ATTORNEY.

Patented Oct. 13, 1936

2,057,008

UNITED STATES PATENT OFFICE 2,057,008

SAFETY DEVICE

Fritz O. Carlson, Worcester, Mass., assignor to Hobbs Manufacturing Company, Worcester, Mass., a corporation of Massachusetts Application March 2, 1936, Serial No. 66,661

2 Claims. (Cl. 192—130)

This invention relates to a safety link for a press or other machine in which a working part is brought against a table or the like by the operation of positive mechanism.

The principal object of the invention is to provide simple means for preventing the application of positive pressure through this link in case the fingers of an operator should get under the working part, or die, before it reaches a position to exert its pressure on the work and to provide that means in such form that it will be absolutely certain to operate at just the right time.

Other objects and advantages of the invention will appear hereinafter.

Reference is to be had to the accompanying drawing, in which

Fig. 1 is a front elevation of a box corner press showing a preferred embodiment of this invention;

Fig. 2 is an edge view of the plunger operating parts;

Fig. 3 is a side view, partly in section, showing the device in its safe position, and Fig. 4 is a sectional view on the line 4—4 of Fig. 2 showing the device in its positive operating position.

This invention is applicable to presses, punching machines, box corner presses and the like and it involves the transmission of power from a crank through a link to a plunger which performs the desired operation. Means is provided for eliminating the possibility of the positive depression of the plunger until the crank gets around to the position where it is just about to apply its final pressure. Therefore, when the plunger is raised far enough so that the fingers of an operator can get under it to place the work and the like there is no chance that the revolving crank can force the plunger down with power to pinch the fingers.

In this case the operating crank 10 has an eccentric stud 12 which rotates about a center of the crank. This stud is circular, but flattened off at 11 so that the stud 12 which extends through a hub 13 and operates it is a segmental cam having a size a little larger than that of a semi-circle. Of course, the flat side 11 is rounded off.

The hub 13 is integrally mounted on one end of a link 14. Pressure is intended to be transmitted from this link to a second hub 15 which is pivoted to the plunger 16 and provided with a die 17 or the like. The hub 15 has extending up from it a shank 18 into the interior of the link 14 which is hollow and is provided with a slot 19 into which extends a pin 20 carried by the link 14. It will be seen from the construction so far described that the rotation of the crank 10 will not operate the head because of the free sliding motion.

Now on the link 14 is a pivot stud 22 and on this pivot stud is a lever 23 having an elongated transverse slot 24 for receiving the stud. One end of this lever, when in operative position, engages a steel bar 25 fixed to the shank 18 and, of course, at that time the other end of the lever rides on the outer circumferential portion of the cam 12, which cam forces back a spring 26 carried on the hub 13. In Fig. 4 the parts are shown in the position just described and are positively connected to perform the desired operation.

In Fig. 3 the normal position of the parts is shown in which the spring 26 swings the lever 23 back into the recess in the crank 12 against the surface 11. This brings the lower end of the lever 23 out of engagement with the plate 25 and the rotation of the crank will not positively press the plunger down. Therefore as long as the crank is rotating in such position as to permit of this, the operator cannot get his fingers caught. Of course, the major part of the descent of the head takes place under these circumstances and although the plunger descends by gravity, being hung on the pin 12, if it encounters any obstruction it will not descend any farther. As soon as the side 11 gets around to engage the upper end of the lever 23 that lever will be moved around to the position shown in Fig. 4. This occurs just before the pressure exerting part of the stroke is ready to take effect and therefore the safety device does not decrease the operative effect of the machine.

This is a very simple construction and positive working so that it will not fail to operate. In fact it is positively prevented from failing to operate at the proper time by the flat side of the cam 12.

Although I have illustrated and described only one form of the invention I am aware of the fact that modifications can be made therein by any person skilled in the art without departing from the scope of the invention as expressed in the claims. Therefore I do not wish to be limited in this respect, otherwise than as set forth in the claims, but what I claim is:—

1. In a safety-device of the class described, the combination of a crank having an eccentric rotating stud provided with a segmental portion, a link consisting of an outer part and an inner part slidably connected together, one of them having an opening for receiving said stud, the outer part of the link being normally free to slide with respect to the inner part, whereby normally it will not exert pressure during the first part of the forward stroke caused by the crank, a lever pivoted on said link, and a spring for normally holding the lever in inactive position, said segmental part of the crank stud being located in position to push the lever in opposition to the spring when the crank has completed a certain predetermined portion of its revolution, the inner part of the link having a recess into which the end of the lever will engage when so pushed to force it forward with the crank.

2. In a safety device of the class described, the combination of a link comprising a hub receiving an eccentric stud to operate it, the eccentric having a segmental portion, a plunger slidably connected with the link and free to allow the link to move down without moving the plunger, said plunger having a recess at one side and a plate at the bottom of the recess, a lever having an end extending into the path of the segmental portion of the eccentric and another end adapted to slide in said recess against said plate, whereby, when the stud rotates to a certain position, the segmental portion will engage the first named end of this lever and swing it into a position in which the other end of the lever will engage in said recess and eventually be stopped by engagement with said plate.

FRITZ O. CARLSON.